United States Patent [19]
Hanaoka

[11] 3,972,685
[45] Aug. 3, 1976

[54] CATALYST CONVERTER

[76] Inventor: Masanori Hanaoka, 1119-63, Kamiike-cho 1-chome, Toyota, Aichi, Japan

[22] Filed: June 9, 1975

[21] Appl. No.: 585,087

Related U.S. Application Data

[62] Division of Ser. No. 448,348, March 5, 1974.

[30] Foreign Application Priority Data
Oct. 3, 1973    Japan.............................. 48-110481

[52] U.S. Cl. .......................... 23/288 FC; 23/288 F; 60/287; 60/299
[51] Int. Cl.² ...................... B01J 8/02; B35J 35/04; F01N 3/15
[58] Field of Search ...... 23/288 F, 288 FA, 288 FB, 23/288 FC; 423/212; 60/287, 299, 301

[56] References Cited
UNITED STATES PATENTS

| | | |
|---|---|---|
| 2,991,160 | 7/1961 | Claussen ............................... 60/299 |
| 3,740,197 | 6/1973 | Scheitlin et al. ......... 23/288 FB UX |
| 3,744,249 | 2/1973 | August..................... 23/288 FA UX |
| 3,751,917 | 8/1973 | Garcea ....................... 23/288 FA X |
| 3,783,619 | 1/1974 | Alquist..................... 23/288 FA UX |
| 3,793,830 | 2/1974 | August..................... 23/288 FA UX |
| 3,804,597 | 4/1974 | Inouee et al. ............ 23/288 FC UX |

Primary Examiner—Morris O. Wolk
Assistant Examiner—Michael S. Marcus
Attorney, Agent, or Firm—Bruce K. Thomas

[57] ABSTRACT

A catalyst converter for purifying the exhaust gas from an internal combustion engine, including a catalyst holder disposed in a casing connected at one end to an exhaust manifold of the engine and at the other end to an exhaust pipe, members for defining passages for the exhaust gas in the casing, and valves in said casing provided in association with said members, said valves being operated to change the direction of the exhaust gas flow in the casing in accordance with the temperature in the catalyst holder.

2 Claims, 9 Drawing Figures

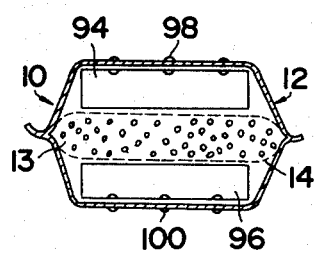
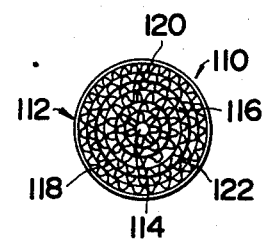
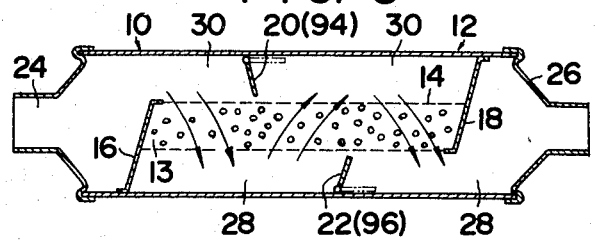
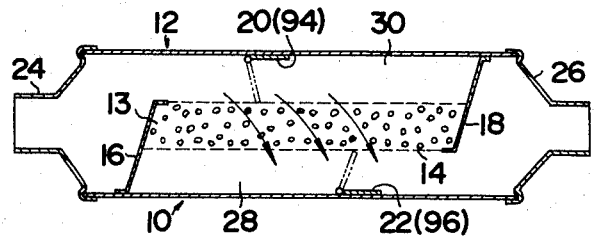
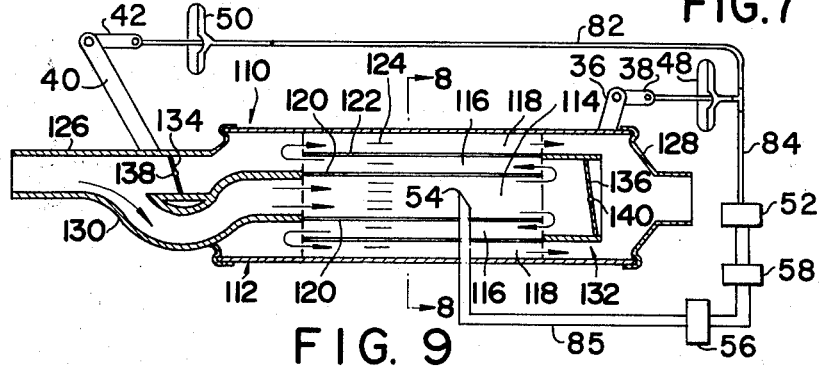
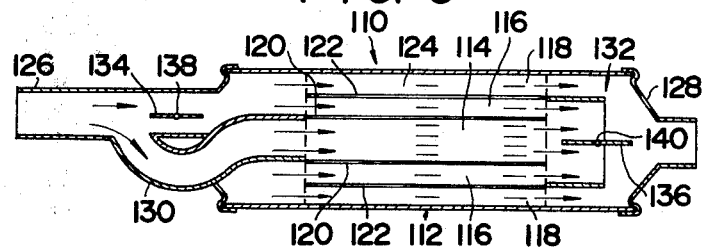

CATALYST CONVERTER

This is a division of application Ser. No. 448,348, filed on Mar. 5, 1974.

BACKGROUND OF THE INVENTION

1. Field of the Invention

This invention relates to a device for purifying exhaust gas from an internal combustion engine, said exhaust gas being one of atmospheric pollution sources, and more particularly to a catalyst converter for purifying the exhaust gas by using catalysts.

The mixture gas of air with fuel to be fed in cylinders of an internal combustion engine is subjected to combustion and explosion within said cylinders, followed by discharging as an exhaust gas outside the cylinders. Such an exhaust gas contains incomplete-combustion gases such as unburned hydrocarbons, carbon monoxide and the like and toxic gases such as NOx produced due to combustion at an elevated temperature.

By the term "a catalyst converter" as used herein is meant a converter which uses catalysts for treatment of an exhaust gas, said treatment comprising the steps of oxidation, reduction, filtration or adsorption of toxic gases contained in exhaust gas, followed by discharge of exhaust gas into atmosphere.

2. Description of the Prior Art

One of the conventional type catalyst converters of the prior art is provided with a member which supports a catalyst holder disposed substantially in the center of a casing having inlet and outlet pipes, with its opposite side portions of said holder being in engagement with the inner walls of said casing, and which defines within the casing a passage for exhaust gas. Another of the conventional type catalyst converters is provided with a member which is located within the casing in concentric relation therewith as in the preceding case and which contains honeycomb catalysts therein and defines a passage for exhaust gas. Such a catalyst converter is so designed as to maintain constant the flow passage of exhaust gas within the catalyst converter and not to extremely lower the output of an engine during the normal operation thereof, thereby achieving efficient purifying action of exhaust gas.

In general, as reported on LA No. 4 mode test, the adverse or toxic components of the exhaust gas discharged during operational conditions covering from the starting, warming-up and the subsequent phases of run of an internal combustion engine are particularly contained in a great amount in the exhaust gas which is discharged for a period from the starting of an engine to the completion of warming-up period.

On the other hand, since the catalysts contained in catalyst converters used with internal combustion engine for purifying said exhaust gas are heated to an activating temperature, principally by means of exhaust gas passing through the catalysts from the internal combustion engine, the temperature of catalysts after the warming-up operation of the engine will reach almost the activating temperature of the catalysts. For this reason, even if a conventional type catalysts converter is provided for the internal combustion engine, the temperature of the catalysts contained in the catalyst converter is maintained below their activating temperature, i.e. before the warming-up run of the internal combustion engine, the converter will fail to achieve sufficient purifying effect on toxic gases, such that the internal combustion engine discharges a great amount of toxic gases into the atmosphere. Accordingly, in order to enhance the purifying action of a catalyst converter before the warming-up run of the internal combustion engine, it is necessary to rapidly raise the temperature of catalysts.

To this end, an attempt may be proposed, in which the cross sectional area of the catalysts layer passing exhaust gas therethrough is reduced so as to minimize the radiation of heat therefrom for the purpose of imparting the heat contained in the exhaust gas to catalysts, thereby accelerating the rate of the temperature rise of the catalysts. However, there will arise a problem that the pressure of the exhaust gas is increased due to such a high level of the load application, with accompanied excessive loss in power output of an engine.

SUMMARY OF THE INVENTION

It is accordingly an object of the present invention to provide a catalyst converter which can purify exhaust gas to a satisfactory extent, even before the warming-up run of an internal combustion engine, while preventing the drop in power output of the engine.

It is a further object of the invention to provide a catalyst converter which can purify the exhaust gas from an internal combustion engine, even before the warming-up run of an engine.

It is a still further object of the invention to provide a catalyst converter which will not lower the power output even at the time of high loading condition of an internal combustion engine.

It is a yet further object of the invention to provide a catalyst converter which may maintain constant the effective amount of the catalyst to be used before and after the warming-up run of an internal combustion engine.

According to the present invention, there is provided a catalyst converter comprising a member which provides the flow passages of the gas passing through a converter casing, and valves associated with said member, whereby the opening and closing of said valve commensurate with the temperature of the catalysts contained within the converter changes the flow passages of the exhaust gas within said converter.

Before the warming-up run of the internal combustion engine, said valve is closed so as to reduce the cross sectional area of the catalyst layer, through which exhaust gas passes to thereby increase the residence time and rapidly raise the temperature of catalysts up to the activating temperature range. On the other hand, after the warming-up run of the internal combustion engine, said valve is opened so as to increase said cross sectional area to thereby prevent the loss in power due to increases in exhaust gas back pressure. This permits rapid purification of an exhaust gas to a great extent, even before the warming-up run of the internal combustion engine, as well as prevention of decrease in power output at the time of high level of load application to the engine, even after the warming-up run of the engine.

BRIEF DESCRIPTION OF THE DRAWINGS

FIG. 4 is a cross sectional view taken along the line 4—4 of FIG. 3;

FIG. 5 and FIG. 6 are cross sectional views illustrating the operations of catalyst converter as shown in FIGS. 2, 3 and 4;

FIGS. 7 and 9 are cross sectional views of the other embodiments of the present invention; and FIG. 8 is a cross sectional view taken along the line 8—8 of FIG. 7.

DETAILED DESCRIPTION OF THE PREFERRED EMBODIMENTS

Figure 1:
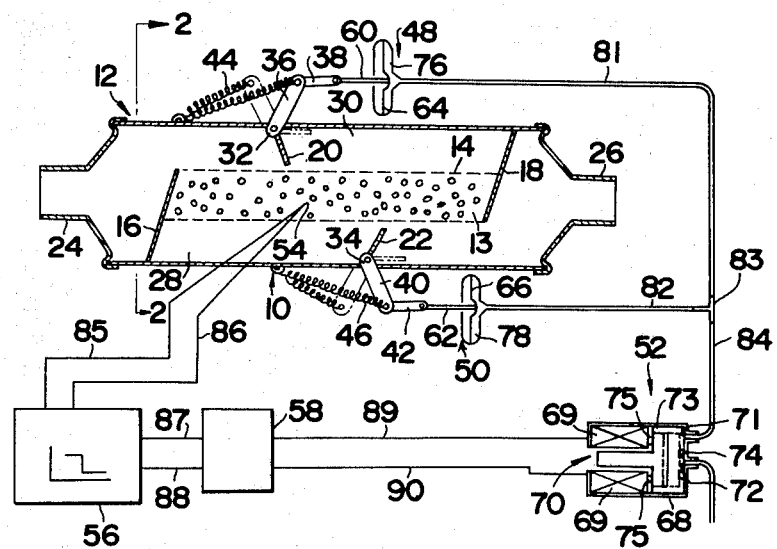
FIG. 1 is a cross sectional view of a catalyst converter according to the present invention.
Figure 2:
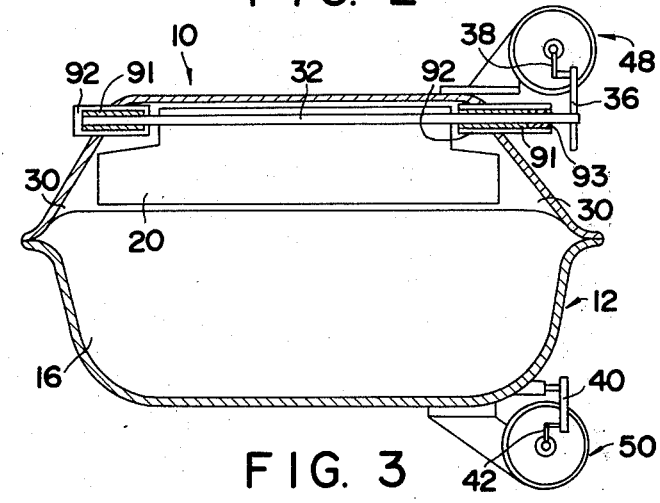
FIG. 2 is a cross sectional view taken along the line 2—2 of FIG. 1.

A converter 10 as shown in FIG. 1 includes a casing 12, a catalyst holder 14 disposed substantially in the center of said casing therein, and spaced along its top and bottom from the inner wall of said casing, with the opposite side portions of said holder being in engagement with the respective inner side walls of said casing, said holder containing the catalyst 13. The converter 10 also includes two sheets of shielding or baffle plates 16 and 18 adapted to transversely close the opposite ends of said holder, and two valves 20 and 22. The casing 12 is provided at its one end with an inlet pipe 24 connected with an exhaust manifold (not shown) of an internal combustion engine and at the other end with an outlet pipe 26 connected with an exhaust pipe (not shown). The shielding plates or baffles 16 and 18 are adapted to close the opposite ends of the holder 14. The shielding or baffle plate 16 extends across and is contoured with the bottom wall of the casing 12, as shown in FIG. 2, to define the front wall of the lower space or outlet plenum 28 and an enclosing side wall for the permeable catalyst holder 14. The plate 16 is spaced along its top edge from the inside of the top wall of the casing 12 to provide therewith the front opening of the upper space or inlet plenum 30. The plate 16 thus supports and closes the front end of the catalyst holder 14, leaving its top permeable surface in communication with the inlet plenum 30.

The other end of the catalyst holder 14 is closed and supported by the shielding or baffle plate 18 that extends across and is contoured with the top wall of the catalyst holder 14, to define the rear wall of the upper space or inlet plenum 30 and an enclosing side wall for the other end of the catalyst holder 14. The plate 18 is spaced along its bottom edge from the inside bottom wall of the casing 12 to provide therewith the rear opening of the lower space or outlet plenum 28. The plate 18 thus supports and closes the rear end of the catalyst holder 14, leaving its bottom permeable surface in communication with the outlet plenum 28. The two valves 20 and 22 are provided intermediate said first shielding plate 16 and the second shielding plate 18. In addition, the first valve 20 which is adapted to close the space 30 is positioned closer to the shielding plate 16 than is the second valve which is adapted to close the space 28.

Thus in the closed position of the valves 20 and 22, the exhaust gases entering the inlet pipe 24 are directed in a circuitous path of longer residence time through the converter 12 in that the shielding plate 16 directs the gases through the catalyst holder 14 into the space or outlet plenum 28, where the valve 22 changes the path back through the catalyst holder into the space or inlet plenum 30, downstream of the valve 20, only to be diverted again by the shielding plate 18 back through the catalyst holder 14 into the space 28 downstream of the valve 22, and thence into the outlet pipe 26. In the open position the valves 20 and 22 the exhaust gases are directed by the shielding plates 16 and 18 in a single pass from the space 30 through the catalyst holder 14 into the space 28 with shorter residence time.

According to the embodiment as shown in FIG. 1, the valves 20 and 22 are formed of plates and supported on shafts 32 and 34 journaled in the casing 12, respectively, while the operating mechanism for the valves 20 and 22 includes a pair of link members 36 and 38, and 40 and 42, springs 44 and 46, and first and second diaphragm mechanisms 48 and 50, the respective diaphragm being connected with a solenoid valve-actuating device 52. The valve-actuating device 52 is adapted to receive through an amplifying circuit 58 a signal from an operating circuit 56 connected to a thermocouple 54 provided within the casing 12, and the device 52 is operated by the signal thus received. Connected to the link members 36 and 40 are springs 44 and 46 which are rigidly affixed at their ends to the outer wall of the casing 12, while the link members 38 and 42 are connected through connecting rods 60 and 62 to diaphragms 64 and 66 of the first and second diaphragm mechanisms 48 and 50. The solenoid valve-actuating device 52 is provided with a casing 68, a solenoid coil 69 located within the casing 68, and a plunger 70 disposed in concentric relation with the coil 69. The casing 68 is provided with a port 71 communicating with diaphragm mechanisms 48 and 50 and with a port 72 communicating with a suction pipe (not shown), while the valve 73 is adapted to close the port 72 through an air tight seal 74 provided on the periphery of the port 72 or brings the ports 71 and 72 in communicating with each other, or otherwise shields the interior of the casing from atmosphere through an air-tight seal 75 provided at one end of the coil 69. The diaphragm chambers 76 and 78 of the first and second diaphragm mechanisms 48 and 50 are each in communication with the port 71 of the solenoid valve-actuating device through pipes 81 and 82 and through a coupling pipe 83 and a pipe 84 coupled with the coupling pipe 83.

The thermocouple 54 is connected through lead wires 85 and 86 to the operating circuit 56 which in turn is connected through lead wires 87 and 88 to the amplifying circuit 58 which is then connected through lead wires 89 and 90 to the solenoid coil 69 of the valve-actuating device 52.

Referring now to FIG. 2 showing an embodiment of securing the valves 20 and 22 to the casing 12, the valve 20 is rigidly journaled on a shaft 32 along the length thereof, said shaft being supported at its ends by the bushings 91 in the bearings 92 mounted on the casing 12, while an air-tight seal 93 is provided between the shaft 32 and the bearing 92. The valve 20 is adapted to close the exhaust gas inlet plenum 30 in its greater part, thereby changing the flowing passage of the exhaust gas passing through the inlet plenum 30.

The thermocouple 54 provided within the catalyst holder 14 is adapted to convert the heat of the catalyst 13 within the holder 14 into an electrical signal to thereby feed same to the operating circuit 56. Depending on whether the signal representing the temperature of the catalyst 13 is above or below the activating temperature, the circuit 56 will transmit a signal through the amplifying circuit 58 to the solenoid coil 69, thereby shifting the plunger 70 of the valve-actuating device 52 to the right or to the left as shown. The rightward shifting of the plunger 70 (as viewed in FIG. 1) will close the port 72 communicating with the suction pipe, thereby bringing the port 71 in communication with atmosphere through the space between the casing 68 and plunger 70, while the leftward shifting of the plunger 70 will convey the negative pressure in the suction pipe through the port 72 and pipes 81, 82 and 84 to the diaphragm chambers 76 and 78 of the first and second diaphragm mechanisms 48 and 50. The rightward shifting of the respective diaphragms 64 and 66 of the diaphragm mechanisms 48 and 50 in the drawing will cause the rightward movement of the connecting rods 60 and 62 along with the link members 38 and 42 against the tension of springs 44 and 46, thereby maintaining the valves 20 and 22 in positions as shown by solid lines in the drawing. This is the case when the catalyst 13 is not yet warmed up, i.e. the temperature of the catalyst 13 is below the activating temperature. On the other hand, in case the detected temperature by the thermocouple 54 goes above the activating temperature of the catalysts 13, the solenoid valve 73 will move to the right to bring the port 71 into communication with atmosphere, whereby, due to the restoring forces of the first and second diaphragm mechanisms 48 and 50 as well as springs 44 and 46, the valves 20 and 22 are maintained in positions shown by broken lines in the drawing.

Figure 3:
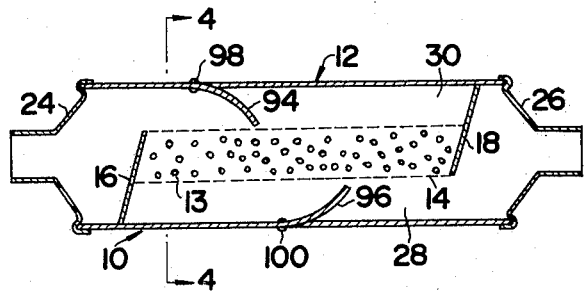
FIG. 3 is a cross sectional view of another embodiment of the present invention.

In passing, the material of the first and second valves may be such as is deformable due to ambient temperature at valves. FIGS. 3 and 4 illustrate first and second valves 94, 96 made of bimetal. In case the temperature within the casing 12 is below the activating temperature, first and second valves 94 and 96 close the plenums 30 and 28 between the inner wall of the casing 12 and the catalyst holder 14, while in case the temperature within the casing 12 is over the activating temperature, the valves 94 and 96 will open plenums 30 and 28, respectively. The valves 94 and 96 are secured through rivets 98 and 100 to the inner wall of the casing 12. Upon starting of the internal combustion engine, the temperature within the casing 12 is low such that the first and second valves 94 and 96 maintain the positions shown by solid lines in the drawing, respectively. In the process of the warming-up run of the engine, i.e., up to the activating temperature, the heat contained in the exhaust gas is absorbed into catalyst 13, such that the temperature within the casing 12 will not rise to a great extent, whereby the valves 94 and 96 will be maintained in said positions. However, after the warming-up run of the engine, i.e., when the temperature at catalyst 13 is raised to the activating temperature, then the temperature within the casing 12 will be extremely raised, such that the first and second valves 94 and 96 made of bimetal will be deformed as shown by the broken lines in the drawing. As is clear from the foregoing, the use of the first and second valves made of bimetal may obviate the use of the operating mechanisms as shown in FIGS. 1 and 2.

The first and second valves 20, 22 and 94, 96 for the catalyst converters as shown in FIGS. 1, 2 and 3,4 are maintained in positions as shown by solid lines in FIG. 5, at the time of starting and before warming-up run of the internal combustion engine. For this reason, the majority of the exhaust gas fed into the casing 12 is passed, in the orders shown by arrows, through the casing 12. More particularly, the exhaust gas fed through the inlet pipe is directed by the shielding plate 16 into the exhaust gas inlet plenum 30 between the casing 12 and holder 14, then transferred through catalyst 13 with the aid of said first valve 20 (or 94) into the exhaust gas outlet plenum 28. Further, the exhaust gas is passed through catalyst 13 with the aid of said second valve 22 (or 96), then back into the exhaust gas inlet plenum 30 through the catalyst 13 with the aid of the baffle plate 18, then into the exhaust gas outlet plenum 28 and to the outlet pipe. In other words, the exhaust gas is passed through catalyst 13 three times, i.e., according to so called three pass system.

On the other hand, after the warming-up run of the engine, as shown in FIG. 6, the first and second valves 20 (94) and 22 (96) are at rest on the inner wall of the casing 12 in close contact therewith, and thus the exhaust gas within the casing 12 is passed through the catalyst 13 just once, i.e., according to one way system.

The cross sectional area of the catalyst layer, through which the exhaust gas passes, may be reduced to one third by means of the first and second valves, comparing before and after the warming-up run of the engine. Accordingly, during warm-up of the engine where the exhaust gas contains the greatest amount of undesirable contaminants, the catalystic converter of this invention provides for repeated successive contacts of the exhaust gas within the catalytic zone and correspondingly greater residence times therein.

FIGS. 7, 8 and 9 show the embodiments of a honeycomb catalyst converter. The honeycomb catalyst converter 110 is provided with the radially spaced tubular members 120 and 122 which define a plurality of passages or plenum 114 116 and 118 provided within the casing 112 in concentric relation therewith, with the honeycomb catalyst 124 being contained in each of said plenums 114, 116 and 118. The tubular members 120 and 122 are made of the same material as that of the casing 112. The casing 112 is provided at its one end with an exhaust gas inlet pipe 126 connected with an exhaust manifold (not shown) and at the other end with an exhaust gas outlet pipe 128 connected with an exhaust pipe (not shown). The innermost passage 114 of the plurality of passages is connected to the inlet pipe 126 by a bypass pipe 130, and there is provided, as an extension of the tubular member 122, an enclosure 132 which extends in spaced relationship with the inner wall of the casing 112 and communicates the innermost passage 114 with the outer next most passage 116 with respect to the passage 114 in a position close to the outlet pipe 128. Furthermore, the converter 110 is provided with a valve 134 positioned in the rear of the branch-point of the bypass pipe 130, i.e., to the right with respect to the branch-point as viewed in FIG. 7. Furthermore, a valve 136 is provided within the enclosure 132, permitting the communcication of the passages 114 and 116 with the outlet pipe 128 when in the open position as shown in FIG. 9 and prevents such communication when in the closed position of FIG. 7. FIG. 8 shows the concentric relationship of these parts. The vane-type valves 134 and 136 are supported on shafts 138 (journalled across the exhaust gas inlet pipe 126) and 140 which is journaled in the casing 112 or the enclosure 132. The valves 134 and 136 are operated by the mechanism as shown in FIG. 1, commensurate to the temperature at the honeycomb catalyst 124.

Before the warming-up run of the internal combustion engine, the first valve 134 closes the passage at a point in the rear (downstream) of the branch-point of the bypass pipe in the inlet pipe 126, i.e., the passage downstream of the inlet 126, while the second valve 136 blocks the communication of the passages 114 and 116 with the outlet pipe 128. With such an arrangement, exhaust gas introduced through the inlet pipe 126 in a direction shown by an arrow in FIG. 7 flows through bypass pipe 130 as well as innermost passage 114 toward the outlet pipe 128. The exhaust gas from the passage 114 flows, due to the closed position of the valve 135 (FIG. 7) enclosure 132, back through the passage 116 provided outwardly of the passage 114 in surrounding relation, toward the inlet pipe 126. The exhaust gas from the passage 116 flows through the chamber defined by closing the first valve 134 in the passage leading to the inlet pipe 126, then through the outermost concentric passage 118 toward the outlet pipe 128, and is then discharged from the outlet pipe. Thus the exhaust gas is subjected to contact with the catalyst 124 for a longer residence time.

On the other hand, after warming-up run, i.e., when the temperature at the honeycomb catalysts reaches the activating temperature, then the first and second valves 134 and 136 open the inlet pipe 126 as shown in FIG. 9, thereby opening the passage of the enclosure 132 to the outlet pipe 128. This causes part of the exhaust gas from the inlet pipe 126 to flow, as shown by arrows in FIG. 9, into the bypass pipe 130 as in the case prior to the warming-up run of the engine, and then into the innermost passage 114, while the other part of the exhaust gas is introduced directly in the outer passages 116 and 118, then through the passages 114, 116 and 118 in the same manner as in the preceding case according to one way flow system and then through the outlet pipe 128 out to atmosphere.

Also in the embodiment of the honeycomb catalyst converter, the cross sectional area of the catalyst layer, through which the exhaust gas passes, may be reduced to one third, when comparing it before and after the warming-up run of an engine, while the exhaust gas through the catalyst then flows through the passage provided outwardly of the innermost passage, whereby the exhaust gas will heat the circumference of the innermost passage to thereby enhancing the warming-up run.

According to the present invention, the amount of catalyst which is used efficiently before and after the warming-up run of the engine may be maintained constant, and the temperature at the catalyst in the process of the warming-up run of an engine may be further rapidly raised to the activating temperature as compared with the conventional case, whereby a great amount of toxic gas discharged from the internal combustion engine in the process of the warming-up run thereof may be purified and prevented to be discharged as toxic gas to atmosphere.

What is claimed is:

1. A catalytic converter for use in purifying exhaust gases from an internal combustion engine comprising:

an elongated walled casing having an inlet conduit at one end and an outlet conduit at the other end;
at least a pair of spaced concentric tubular members axially disposed within said casing which form a plurality of annular passages for gas flow therethrough;
a honeycomb catalyst member disposed in said annular passages;
one of said tubular members extending centrally of said casing and another of said tubular members being spaced outside of said central tubular member and spaced from the inside wall of said casing;
a bypass conduit connected to and communicating with said inlet conduit exterior of said casing at one end of said bypass conduit and connected to said central tubular member at the other end of said bypass conduit;
said other tubular member having a tubular extension disposed from its end adjacent said outlet conduit and encompassing the outlet end of said tubular members;
a first normally closed valve means disposed within said inlet conduit between its juncture with said bypass conduit and said casing;
a second normally closed valve means disposed within said extension;
temperature sensing means located within said catalyst member; and
control means operatively connected to said valve means and responsive to said temperature sensing means to simultaneously open said valve means and decrease the residence time of said gases within said catalyst as a function of said temperature.

2. A catalytic converter in accordance with claim 1 in which:

said valve means each comprise a vane member;
a pivot shaft supported by said inlet conduit and affixed to said vane member of said first valve means;
a pivot shaft supported by said tubular extension and affixed to said vane member of said second valve means;
lever means affixed to one end of each of said pivot shafts;
means biasing said lever means to rotate said pivot shafts and respective vane members to positions blocking the passage of exhaust gases at their respective positions; and
means responsive to the temperature within said catalyst member and operatively connected to each of said biasing means to pivot said lever means and said vane members to the open position upon an increase in said temperature.

* * * * *